US009873572B2

(12) United States Patent
Aoyama et al.

(10) Patent No.: US 9,873,572 B2
(45) Date of Patent: Jan. 23, 2018

(54) PART FEEDER APPARATUS

(71) Applicant: Shoji Aoyama, Osaka (JP)

(72) Inventors: Shoji Aoyama, Osaka (JP); Yoshitaka Aoyama, Osaka (JP)

(73) Assignee: Shoji Aoyama, Osaka (JP)

( * ) Notice: Subject to any disclaimer, the term of this patent is extended or adjusted under 35 U.S.C. 154(b) by 0 days.

(21) Appl. No.: 15/311,928

(22) PCT Filed: May 20, 2015

(86) PCT No.: PCT/JP2015/064442
§ 371 (c)(1),
(2) Date: Nov. 17, 2016

(87) PCT Pub. No.: WO2015/182450
PCT Pub. Date: Dec. 3, 2015

(65) Prior Publication Data
US 2017/0088365 A1 Mar. 30, 2017

(30) Foreign Application Priority Data

May 24, 2014 (JP) ................. 2014-119983
May 31, 2014 (JP) ................. 2014-124743
(Continued)

(51) Int. Cl.
B65G 47/12 (2006.01)
B65G 47/92 (2006.01)
(Continued)

(52) U.S. Cl.
CPC ............. *B65G 47/12* (2013.01); *B65G 11/00* (2013.01); *B65G 27/00* (2013.01); *B65G 47/22* (2013.01);
(Continued)

(58) Field of Classification Search
CPC .................. B65G 47/22; B65G 47/92
See application file for complete search history.

(56) References Cited

U.S. PATENT DOCUMENTS 3,709,385 A * 1/1973 Klapes ............... B65G 47/92
212/195
5,757,092 A * 5/1998 Graham ............ B65G 27/24
198/769
(Continued)

FOREIGN PATENT DOCUMENTS

JP 51-69980 6/1976
JP 60-23224 2/1985
(Continued)

OTHER PUBLICATIONS

Office Action dated Dec. 1, 2015 in corresponding Japanese Application No. 2014-124743, with English translation.
(Continued)

*Primary Examiner* — Thomas Randazzo
(74) *Attorney, Agent, or Firm* — Wenderoth, Lind & Ponack, L.L.P.

(57) ABSTRACT

A lower portion is formed in a vicinity of an end portion of a bottom member of a storage container. A lift member configured to lift parts kept on standby on the lower portion is arranged in a state of being movable up and down along an inner wall of the storage container. A transport unit configured to transport the part, which is lifted and transferred thereto by the lift member, to a target position is arranged, and a position at which the parts are to be transferred to the transport unit is set in a vicinity of an upper position of the lift member.

2 Claims, 10 Drawing Sheets

(30) Foreign Application Priority Data

| Jun. 7, 2014 | (JP) | 2014-129660 |
| Aug. 5, 2014 | (JP) | 2014-168837 |
| Sep. 10, 2014 | (JP) | 2014-201977 |
| Feb. 2, 2015 | (JP) | 2015-031079 |

(51) Int. Cl.
    *B65G 47/256*     (2006.01)
    *B65G 11/00*     (2006.01)
    *B65G 47/82*     (2006.01)
    *B65G 27/00*     (2006.01)
    *B65G 47/22*     (2006.01)

(52) U.S. Cl.
    CPC .......... *B65G 47/256* (2013.01); *B65G 47/82* (2013.01); *B65G 47/92* (2013.01)

(56) References Cited

U.S. PATENT DOCUMENTS

| 7,416,086 B2 * | 8/2008 | Lanni | B07C 5/06 209/659 |
| 8,336,716 B2 * | 12/2012 | Aoyama | B23K 11/0053 209/660 |
| 2005/0242004 A1 | 11/2005 | Lanni | |

FOREIGN PATENT DOCUMENTS

| JP | 60-102313 | 6/1985 | | |
| JP | 61-271074 | 12/1986 | | |
| JP | 7-5183 | 1/1995 | | |
| JP | 9-25010 | 1/1997 | | |
| JP | 3034481 | 2/1997 | | |
| JP | 2002-302230 | 10/2002 | | |
| JP | 2002-302237 | 10/2002 | | |
| JP | 2002-362751 | 12/2002 | | |
| JP | 2006-8349 | 1/2006 | | |
| JP | 2007-91362 | 4/2007 | | |
| JP | 2007-167949 | 7/2007 | | |
| JP | 2008-114970 | 5/2008 | | |
| JP | 2009-132497 | 6/2009 | | |
| JP | 2010-260653 | 11/2010 | | |
| JP | 2017043492 A | * | 3/2017 | |
| SE | WO-02074667 A1 | * | 9/2002 | .......... B65G 47/145 |
| WO | WO-02074667 A1 | * | 9/2002 | .......... B65G 47/145 |

OTHER PUBLICATIONS

Office Action dated Dec. 8, 2015 in corresponding Japanese Application No. 2015-207535, with English translation.

Office Action dated Dec. 1, 2015 in corresponding Japanese Application No. 2014-129660, with English translation.

International Preliminary Report on Patentability and Translation of Written Opinion of the International Searching Authority dated Nov. 29, 2016 in International (PCT) Application No. PCT/JP2015/064442.

International Search Report dated Aug. 4, 2015 in International (PCT) Application No. PCT/JP2015/064442.

* cited by examiner

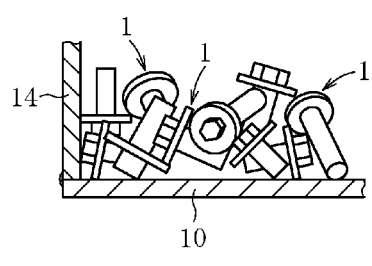
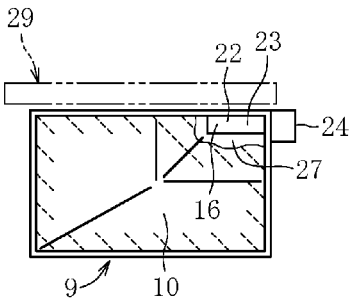
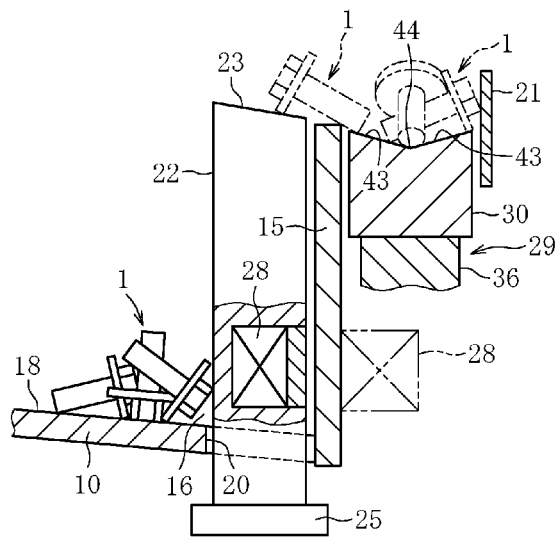
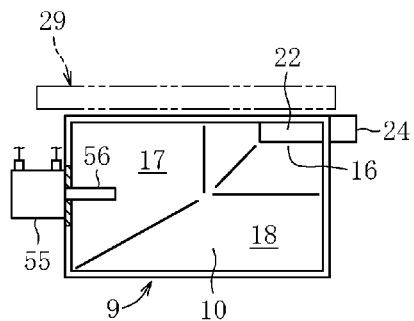

PART FEEDER APPARATUS

TECHNICAL FIELD

The present invention relates to a parts feeder configured to lift parts accommodated in a storage container by a lift member to transfer the parts to a transport unit, and to feed the parts to a target position by the transport unit.

BACKGROUND ART

In JP 2002-362751 A, there is disclosed a technology of lifting parts stored on a bottom of a container by a lift bar to transfer the part into a standby container, and of allowing a worker to open a lid of the standby container to pick up the part when the number of parts in the standby container reaches a predetermined number.

CITATION LIST

Patent Literature 1: JP 2002-362751 A

SUMMARY OF INVENTION

Technical Problem

According to the technology disclosed in the patent literature described above, the lift bar has a double structure in which an inner bar is inserted into a hollow pipe. When the part is lifted, the inner bar is at a position of being retracted in the hollow pipe. At a position at which the lift bar is fully moved up, the inner bar is moved forward so as to drop the parts into the standby container.

With the structure described above, only one part is lifted each time the lift bar is moved up. Therefore, there is a problem in that conveyance efficiency may not be improved. Further, the lift bar has the double structure, and hence a mechanism configured to actuate the lift bar becomes complex, which is disadvantageous in achieving a compact apparatus.

The present invention has been made to solve the problems described above, and has an object to provide a parts feeder capable of efficiently conveying a plurality of parts and simplifying an apparatus structure.

Solution to Problem

According to a first aspect of the present invention, there is provided a parts feeder, comprising: a lower portion formed in a vicinity of an end portion of a bottom member of a storage container; a lift member, which is configured to lift parts kept on standby on the lower portion, and is arranged in a state of being movable up and down along an inner wall of the storage container lower portion; and a transport unit configured to transport the part, which is lifted and transferred thereto by the lift member, to a target position, a position at which the part is to be transferred to the transport unit being set in a vicinity of an upper position of the lift member.

Advantageous Effects of Invention

The lower portion is formed in the vicinity of the end portion of the bottom member of the storage container. The lift member configured to lift the part kept on standby on the lower portion is arranged in a state of being movable up and down along the inner wall of the storage container. Thus, the lift member is moved up and down along an end portion of the storage container, thereby being capable of increasing the amount of parts to be accommodated in the storage container as much as possible. Specifically, the lower portion is positioned in the vicinity of the end portion of the bottom member, and hence the lift member can also be arranged close to the end portion of the storage container. With this, enlargement of a space for accommodating parts can be achieved.

The lift member is moved up and down along the inner wall of the storage container. Thus, a part placed on an upper surface of the lift member is lifted while being in contact with the inner wall or having a slight gap from the inner wall. Therefore, the part is maintained in a state of being placed on the upper surface of the lift member so that the part is reliably transferred to the transport unit. As a result, operation reliability of the apparatus may be improved. Further, a parts placement surface of the lift member is set to be large so that a large number of parts can be transported with a single lifting action, thereby being capable of improving conveyance efficiency.

Further, the lift member is moved up and down along the inner wall of the storage container. Thus, the part kept on standby on the lower portion can be reliably lifted. Further, a lifting resistance of the lift member that is moved up so as to push through mass of parts is reduced. Thus, only a small driving force is required to move up the lift member. For example, when the lift member is moved up and down by an air cylinder, this is effective for downsizing of the air cylinder.

The position at which the part is transferred onto the transport unit is set in the vicinity of the upper position of the lift member. Thus, the part is reliably transferred to the transport unit. At the same time, an elongated transport unit, e.g., a linear feeder can be arranged along a side surface of the storage container. Thus, the position is effective for compactification of the entire apparatus.

According to a second aspect of the present invention, there is provided the parts feeder, wherein the transport unit comprises an elongated linear feeder, and wherein the linear feeder is arranged along a straight lateral side surface of the storage container.

With the combination of the elongated transport unit and the straight lateral side surface of the storage container, integration of the storage container and the transport unit can be achieved with minimum spacing, which is effective for the compactification of the apparatus.

According to a third aspect of the present invention, there is provided the parts feeder, further comprising: a partition control member configured to partition the storage container into a first storage space and a second storage space, the first storage space being formed as a space for storing a large amount of the parts to be supplied from outside, the second storage space being formed as a standby space for storing the parts lifted by the lift member are reduced in amount as compared with the large amount of parts stored in the first storage space; and a passage portion configured to limit an amount of the parts to be moved to the second storage space by causing entanglement of the parts transported from the first storage space to the second storage space, the passage portion being formed between a lower end portion of the partition control member and the bottom member.

For example, when the part has an angular shape or a serrated shape like a male thread, for example, as in the case of a bolt with a washer or a projection nut with a welding projection, the parts become tangled or clogged when passing through the passage portion. As a result, smooth passage becomes more difficult. The passage is limited at the passage portion as described above, and hence the amount of parts staying in the second storage space becomes remarkably smaller than the amount of parts stored in the first storage space. The second storage space serves as a standby space for the parts reduced in amount as described above. As a result, the number of parts lifted by the lift member is prevented from becoming excessively large. Thus, power required to move up the lift member can be reduced. When the lift member is moved up by, for example, an air cylinder, a size of the air cylinder and the amount of compressed air to be used can be reduced, which is economically advantageous.

In other words, for example, when a large amount of parts are stored in the first storage space, the lift member is required to be pushed up against a resistance caused by a weight of the large amount of parts or the entanglement of the parts. In the second storage space, however, the parts reduced in amount are kept on standby. Therefore, the lifting resistance to the lift member is reduced.

Meanwhile, a function of storing a large amount of the parts in the first storage space is reliably achieved by the limitation of the passage at the above-mentioned passage portion. Therefore, even when a storage space of the first storage space is enlarged, adverse effects such as excessive feeding to the second storage space can be prevented. Further, an interval of feeding the parts to the first storage space can be prolonged, which is advantageous in terms of part feeding management.

In the manner described above, the amount of parts to be stored in the first storage space can be increased, while appropriate reduction in amount of standby parts in the second storage space can be achieved.

According to a fourth aspect of the present invention, there is provided the parts feeder, wherein the passage portion is formed at a position close to the lift member so that the part having passed through the passage portion is guided toward the lift member.

The passage portion is formed at the position close to the lift member. Therefore, the parts that are limited in the amount to be moved at the passage portion are guided toward the lift member. Specifically, the parts are moved toward the lift member with limitation on the number of parts allowed to pass by the passage portion. Therefore, the number of parts lifted up by the lift member is prevented from becoming excessively large, thereby reducing a lifting load of the lift member.

According to a fifth aspect of the present invention, there is provided the parts feeder, further comprising an elongated guiding slope toward the lower portion, wherein the elongated guiding slope is formed as a part of a slope of a bottom member of the second storage space, and is formed in a horizontal state with respect to a width direction or in an inclined state so that an end portion on a side closer to the partition control member becomes higher while being formed so as to become lower toward the lower portion.

The parts stored in the second storage space are guided to the lower portion in such a manner as to slide down the guiding slope. Some of the parts stored over the entire region of the second storage space are smoothly guided to the lower portion through the elongated guiding slope. Therefore, the parts in the second storage space are sequentially shifted to the lower portion through the guiding slope. In other words, among the parts present within the entire region of the second storage space, the parts present on the guiding slope slide down the elongated slope toward the lower portion. Thus, the parts in the second storage space are reliably transferred onto the lower portion, specifically, the lift member through the guiding slope. Therefore, the part feeding to a target position is reliably achieved by the lift-up and the action of the transport unit described above.

The guiding slope lies in the horizontal direction as with respect to a width direction. Therefore, the parts present on the guiding slope are less liable to fall off the guiding slope. Therefore, the number of parts transferred to the lower portion can be further increased. With this, the number of parts lifted by the lift member is increased, thereby being capable of securing the number of parts conveyed by the transport unit without shortage.

Further, the guiding slope is formed in an inclined state so that an end portion on a side closer to the partition control member is high. Thus, when the guiding slope is arranged along the inner wall of the storage container, the parts placed on the guiding slope slide down the slope while being in contact with the inner wall of the storage container. As a result, the parts present on the guiding slope are less liable to fall off the guiding slope, which is suitable to increase the number of parts to be transferred toward the lower portion.

There maybe employed a configuration of causing parts to drop from a sorting member arranged in the transport unit into the second storage space when the parts are transferred in an abnormal posture, or when a size of the part is excessively large or excessively small. When such a dropping configuration is employed, there may also be employed a configuration of receiving the dropped parts by the guiding slope. As a result, the dropped part is transferred preferentially by the lift member so as to prevent the amount of parts stored in the second storage space from becoming excessively large. In this manner, smooth part feeding can be performed.

The parts transferred onto the lift member may take various postures. Therefore, the parts transferred to the transport unit are not all conveyed in a normal posture. Therefore, the parts taking abnormal postures are dropped from the sorting member into the second storage space with a certain probability. The thus dropped parts are guided preferentially to the lower portion through the guiding slope, thereby being capable of storing an appropriate amount of parts in the second storage space.

BRIEF DESCRIPTION OF DRAWINGS

FIG. 6A is a view for illustrating mass of parts under a state in which the bolts are tangled.

FIG. 6B is a plan view for illustrating an empty space in which the bolts are absent.

FIG. 7 is a sectional view for illustrating a state in which the lift member is moved up.

FIG. 8 is a plan view for illustrating another case example.

DESCRIPTION OF EMBODIMENTS

Next, modes for carrying out a parts feeder of the present invention are described.

First Embodiment

FIG. 1 to FIG. 8 are views for illustrating a first embodiment of the present invention.

First, a target part is described.

Figure 18A:
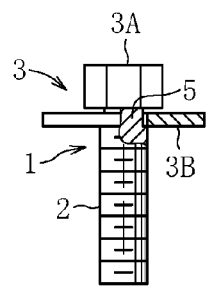
FIG. 18A is a side view for illustrating a shape of a part.
Figure 18B:
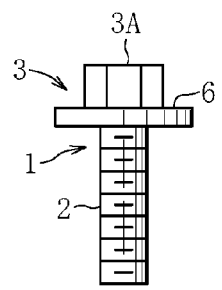
FIG. 18B is a side view for illustrating a shape of a part.
Figure 18C:
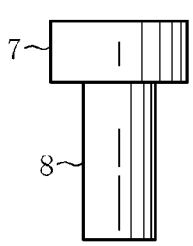
FIG. 18C is a side view for illustrating a shape of a part.

Target parts are illustrated in FIG. 18A, FIG. 18B, and FIG. 18C. In FIG. 18A, a bolt with a washer is illustrated. A bolt 1 comprises a shaft part 2 and a head part 3. The head part 3 comprises a hexagonal part 3A having a larger diameter than the shaft part 2, and a washer 3B. The washer 3B is assembled to a small-diameter part 5 of the shaft part 2 so as to be allowed to move with play without being removed from the shaft part 2.

Further, in the target part illustrated in FIG. 18B, the head part 3 comprises the hexagonal part 3A and a flange 6 formed integrally with the hexagonal part 3A. The shaft part 2 has male threads. The male threads are illustrated only in FIG. 18A and FIG. 18B, and the illustration of the male threads is omitted in the other drawings.

FIG. 18C is an illustration of a shaft-like part with a head part, which comprises a short cylindrical head part 7 and a shaft part 8 without male threads. The above-mentioned three kinds of parts are all made of iron. Other than the parts described above, a projection nut having a rectangular shape with welding projections at four corners can be used as a target. Such a projection nut is also parts having angular projection-like portions, similarly to the above-mentioned bolt with a washer.

Although there are various kinds of target parts like those described above, the bolt 1 with a washer illustrated in FIG. 18A is described herein.

Next, a storage container is described.

A storage container 9 configured to accommodate a large number of the bolts 1 has a rectangular box-like shape as viewed from immediately above. Wall plates 12, 13, 14, and 15 made of stainless steel are welded to four sides of a bottom member 10 formed of a rectangular plate material made of stainless steel.

In a vicinity of an end portion of the bottom member 10 of the storage container 9, there is formed a lower portion 16. The lower portion 16 is arranged on the upper right in FIG. 1. Therefore, there are formed a first slope 17 sloping down to the right in FIG. 1 and a second slope 18 sloping down to the upper side in FIG. 1. Each of the first slope 17 and the second slope 18 becomes steeper in midway, and hence holding lines 19 are formed. Through a combination of the first slope 17 and the second slope 18, the lower portion 16 is formed at a corner portion of the rectangular storage container 9, which is formed between the wall plate 12 and the wall plate 15.

Although not illustrated, it is desired that an openable lid be provided to the storage container 9 so as to prevent impurities such as iron scraps from being mixed with the bolts 1.

Next, a lift member is described.

Figure 3:
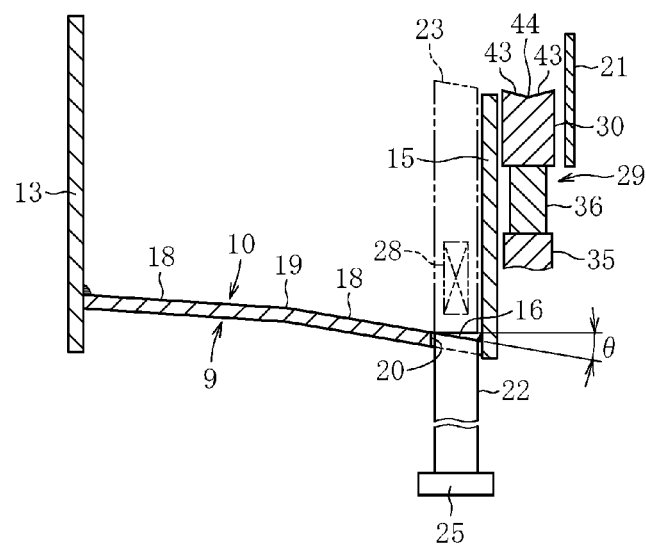
FIG. 3 is a sectional view taken along the line (3)-(3) of FIG. 1.

A rectangular passage hole 20 is formed at the upper right corner of the bottom member 10. A lift member 22 is constructed of a member obtained by forming a thick plate material into an elongated shape, and is movable up and down in an approximately vertical direction. A placement surface 23 configured to allow the bolt 1 to be placed thereon is formed on an upper surface of the lift member 22. Although the placement surface 23 maybe a horizontal surface, the placement surface 23 is formed as a flat slope that is lower on the wall plate 15 side so as to prevent the bolt 1 from falling off. An inclination angle θ is illustrated in FIG. 3. The lift member 22 is made of stainless steel which is a non-magnetic material.

Figure 5A:
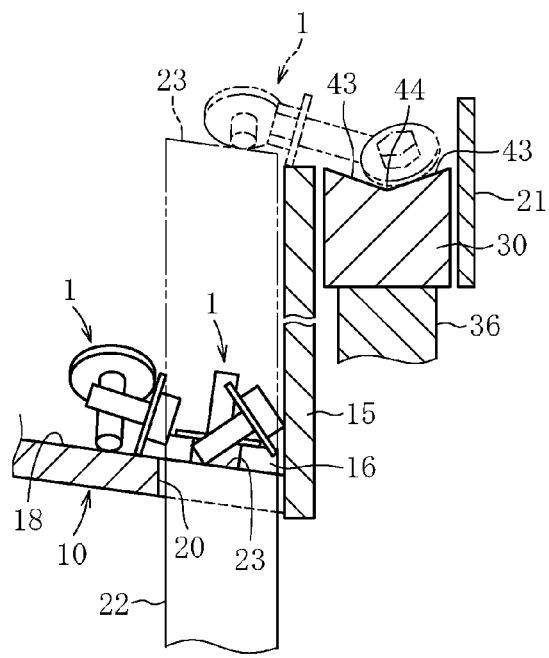
FIG. 5A is a sectional view for illustrating a state in which a lift member is positioned at a lowest level.

When the lift member 22 is positioned at a lowest level, the placement surface 23 is in a state of being continuous with the inclined bottom member 10 (second slope 18) as illustrated in FIG. 3 and FIG. 5A. In this manner, the bolt 1 having been transferred to the lower portion 16 is kept on standby on the placement surface 23.

The lift member 22 is arranged in a state of being movable up and down along inner walls of the storage container 9, and is moved up and down along inner surfaces of the wall plate 15 and the wall plate 12 in this case. The upward and downward movement along the inner surfaces of the wall plate 15 and the wall plate 12 means that the lift member 22 is moved up and down while outer surfaces thereof are in contact with the inner surfaces of the wall plate 15 and the wall plate 12, or is moved up and down with a slight gap between the outer surfaces of the lift member 22 and the inner surfaces of the wall plate 15 and the wall plate 12. Then, the number of bolts 1 to be placed is determined depending on an area of the placement surface 23. In the illustrated case, the number of bolts 1 to be placed is three.

An air cylinder 24 configured to move the lift member 22 up and down is fixed to the wall plate 12. A piston rod 26 of the air cylinder 24 is coupled to a support plate 25 coupled to a lower end of the lift member 22. A back-and-forth output of the air cylinder 24 causes the lift member 22 to move up and down.

Next, entanglement of the bolts is described.

In FIG. 6A, a tangled state of the bolts is illustrated. When a large number of bolts 1 are accommodated in the storage container 9, various types of entanglement or clogging of the bolts may occur due to an angular portion of an end portion of the shaft part 2 biting into a thread on the bolt 1, the flanges 6 overlapping with each other, a crest portion fitting into a root portion of the thread, exertion of weight of the bolt 1, and the like. Therefore, even with an inclination of the first slope 17 and an inclination of the second slope 18, the bolts 1, in some cases, cannot slide toward a lower side.

Such a phenomenon described above sometimes occurs due to the above-mentioned entanglement or clogging. Once the phenomenon occurs, there is formed mass of parts in which the large number of bolts 1 are tangled in such a manner as to be bound together is generated. When such a state occurs, there is formed an empty space 27 in which the bolts 1 are absent as illustrated in FIG. 6B. As a result, there arises a phenomenon in which the bolts 1 are not kept on standby on the placement surface 23 of the lift member 22. As a result, the bolt 1 cannot be transported.

In order to prevent a so-called "locked phenomenon" described above, there is provided a sucking unit configured to partially suck the mass of parts including the entangled bolts 1 toward the lower portion 16 or a pushing unit configured to partially push the mass of parts toward the lower portion 16.

In FIG. 7, a case with the sucking unit is illustrated. A permanent magnet 28 is embedded in the lift member 22. A height position of the permanent magnet 28 is set to a position at which the bolt 1 can be attracted to the lower portion 16 when the lift member 22 is moved up to a highest level. Specifically, when the lift member 22 is positioned at the highest level, the permanent magnet 28 is kept on standby near the second slope 18.

When the permanent magnet 28 is stopped at the position illustrated in FIG. 7, the bolts 1 in the bound state are attracted toward the permanent magnet 28. Thus, the bolts 1 are moved to a region of the empty space 27 so that the mass of parts in the bound state is partially disentangled. Continuously therewith, a disentangling action develops in a chain-reaction manner to increase a range in a non-bound state in a region close to the permanent magnet 28. In this manner, the entangled mass of parts is partially sucked toward the lower portion 16 so as to bring the bolts 1 into a standby state through the partial disentanglement. Further, the range of disentanglement is extended to achieve reliable transport to the lift member 22 without an idling action.

The permanent magnet 28 can also be arranged on an outer side of the wall plate 15 as indicated by the chain double-dashed line in FIG. 7.

Meanwhile, a case with the pushing unit is illustrated in FIG. 8. An air cylinder 55 is mounted onto an outer side of the storage container 9. A pushing member 56 to be advanced and retracted by the air cylinder 55 is arranged so as to be capable of projecting into the storage container 9. Herein, the pushing member 56 is constructed of a piston rod of the air cylinder 55. Although not illustrated, a push plate may be welded to a distal end of the pushing member 56 to allow a pushing force to be exerted by a large surface of the plate onto the large number of bolts 1.

After the pushing member 56 is forced to advance toward the mass of parts in the bound state, the entanglement or the clogging of the bolts is reduced to disentangle the bound bolts on a side in an extending direction of the pushing member 56. By the disentanglement described above, the bolts 1 slide down the first slope 17 while being forcibly pushed out so that the bolts 1 reach the region of the empty space 27. In this manner, the bolts 1 are kept on standby on the placement surface 23.

Next, a transport unit is described.

The transport unit is configured to transport the bolt 1 lifted by the lift member 22 to a target position and, for example, is configured to align the bolts 1 to have a predetermined posture and transport the bolts 1 to the target position. As the transport unit, various forms such as one configured to cause the bolt 1 to slide down or one configured to transport the bolt 1 utilizing vibration can be employed. Herein, the latter vibration type linear feeder is described.

A linear feeder 29 serving as the transport unit is provided. The linear feeder 29 is arranged so that a longitudinal direction thereof extends along a flat and straight outer surface of the wall plate 15. The linear feeder 29 comprises a receiving member 30 onto which the bolt 1 is transferred, a suspending member 31 being continuous therewith, and a sorting member 32 being continuous with the suspending member 31, which are arranged linearly. The bolt 1 is fed from the sorting member 32 to the target position or fed to the target position through a suspending member 33 similar to the suspending member 31.

Figure 4:
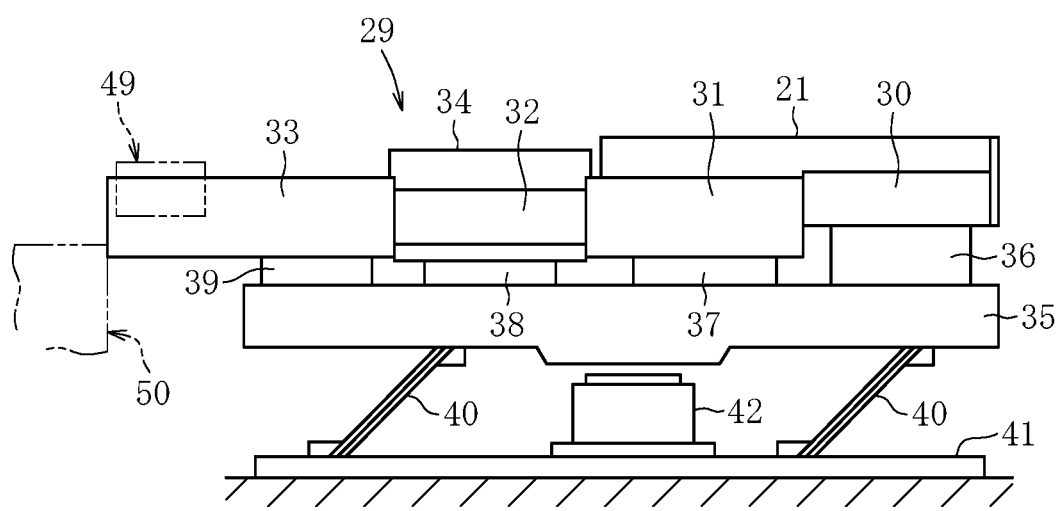
FIG. 4 is a side view of a linear feeder.

As illustrated in FIG. 4, the receiving member 30, the suspending member 31, the sorting member 32, and the suspending member 33 are coupled onto an elongated base member 35 through intermediation of supporting members 36, 37, 38, and 39 with bolts or the like. The base member 35 is arranged above a stationary member 41 by two plate springs 40 arranged obliquely. Vertical vibration is applied to the base member 35 with an electromagnet 42, to thereby form a transport output component to the left in FIG. 4. With this, the bolts are transported.

In order to concentrate the bolts 1 to a center of the receiving member 30, slopes 43, each sloping downward to the center, are formed on right and left so as to form a shallow V-shaped sectional portion 44. A portion to which the bolt 1 is transferred, i.e., the V-shaped sectional portion 44 is arranged in the vicinity of an upper position of the lift member 22. As illustrated in FIG. 3, FIG. 5A, and FIG. 7, when the lift member 22 is positioned at the highest level, the placement surface 23 and the V-shaped sectional portion 44 have a positional relationship of being adjacent to each other with the wall plate 15 therebetween.

Figure 5B:
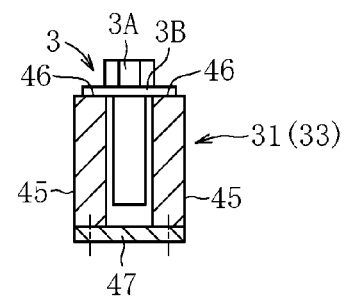
FIG. 5B is a sectional view for illustrating a suspending structure for a bolt.

As illustrated in FIG. 5B, the suspending member 31 is supported under a state in which a lower surface of the washer 3B, i.e., a lower surface of the head part 3 can slide on slide surfaces 46 of a pair of parallel rail members 45. Then, the shaft part 2 passes between the rail members 45 in a suspended state. The rail members 45 have lower portions integrated with each other by a coupling member 47.

Next, a dropping structure portion is described.

At a position for a step of parts feeding, a normal bolt 1A having a normal length, an excessively long bolt 1B having an excessively large length, and an excessively short bolt 1C having an excessively small length may be transported in proximity to each other. With some cause, for example, an operator sometimes erroneously mixes the excessively long bolt 1B or the excessively short bolt 1C into the normal bolts 1A. For such case of abnormal mixture described above, the sorting member 32 is arranged so as to be continuous with the suspending member 31. Further, when the normal bolt 1A is oriented upside down or is not correctly brought into a suspended state, there is a fear of conveyance in an abnormal posture. In such a case, the normal bolt 1A also needs to be excluded.

The sorting member 32 serves as a main member to form the dropping structure portion for the shaft-like member with a head part.

Figure 5C:
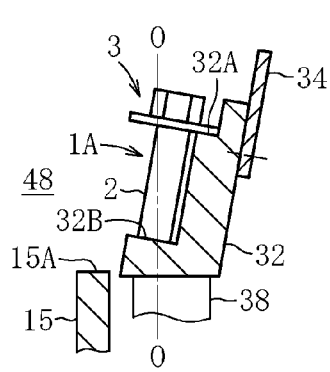
FIG. 5C is a sectional view for illustrating a transported state of a normal bolt on a sorting member.
Figure 5D:
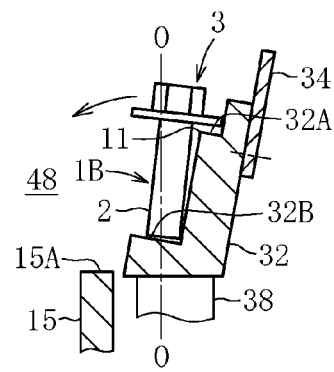
FIG. 5D is a sectional view for illustrating a dropping action of an excessively long bolt on the sorting member.
Figure 5E:
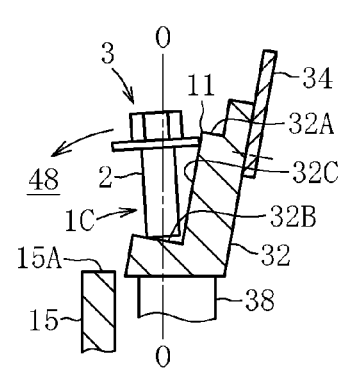
FIG. 5E is a sectional view for illustrating a dropping action of an excessively short bolt on the sorting member.

The sorting member 32 is a structure portion configured to drop the bolt 1B or 1C having an abnormal length into the storage container 9 or drop the normal bolt 1A in an abnormal posture. For this purpose, a left side of the sorting member 32 is open as illustrated in FIG. 5C, FIG. 5D, and FIG. 5E. The opening is oriented toward an open space 48. At the same time, a cutout portion 15A is formed in an upper portion of the wall plate 15 so as to allow the bolts 1B and 1C, each having an abnormal length, to drop into the storage container 9. In this manner, when the length of the bolt 1 conveyed in the suspended state by the rail members 45 is abnormal, an abnormal part is removed from the rail members 45 by dropping.

As illustrated in FIG. 5C, there are formed a flat first slide surface 32A on which a lower surface of the head part 3 (lower surface of the washer 3B) slides, and a flat second slide surface 32B on which a lower end portion (lower end surface) of the shaft part 2 slides. A vertical distance between both the slide surfaces 32A and 32B is set equal to a length of the shaft part 2. A center axis line of the shaft part 2 passes through an approximately center portion of the second slide surface 32B, whereas the first slide surface 32A is arranged at a position deviated from the center axis line of the shaft part 2 toward an inclined side. In this manner, the lower surface of the head part 3 and the lower end portion of the shaft part 2 slide on the first slide surface 32A and the second slide surface 32B, respectively, at the same time.

Then, the bolts 1B and 1C, each having an abnormal length, drop in a direction indicated by the arrowed lines in FIG. 5D and FIG. 5E. Meanwhile, the sorting member 32 is arranged in a posture inclined to a side opposite to the dropping direction. Specifically, an upper side of the sorting member 32 is inclined to the right relative to a vertical line O-O.

The normal bolt 1A is supported so that the lower surface of the head part 3 and the lower end portion of the shaft part 2 can slide on the first slide surface 32A and the second slide surface 32B, respectively, at the same time. Therefore, as illustrated in FIG. 5C, the normal bolt 1A is directly transported in such a stable state as to lean toward the right side of FIG. 5C, and transferred to the suspending member 33.

As described above, the lower surface of the head part 3 and the lower end portion of the shaft part 2 slide on the first slide surface 32A and the second slide surface 32B, respectively, at the same time. Therefore, even when the vibration of the linear feeder 29 is applied to the normal bolt 1A, stable transport is performed without causing a fall.

When the excessively long bolt 1B is transferred to the sorting member 32, the head part 3 is placed at a position spaced above the first slide surface 32A. Thus, a standing state of the bolt 1B becomes unstable. Then, the vibration is applied, and hence the bolt 1B drops in a falling fashion in the direction indicated by the arrowed line. Further, the upper side of the excessively long bolt 1B is slightly inclined to the right relative to the vertical line O-O. The excessively long bolt 1B drops due to the above-mentioned unstable state and vibration. An inclination angle of the sorting member 32 may be slightly reduced so as to incline the excessively long bolt 1B slightly to the left side relative to the vertical line O-O, to thereby facilitate the dropping.

As illustrated in FIG. 5D, the excessively long bolt 1B becomes unstable as described above because an outer peripheral portion of the head part 3 is held in contact with an upper portion of the sorting member 32 to cause transmission of the vibration from a contact portion to the head part 3 and formation of a space between the head part 3 and the first slide surface 32A.

When the lower end portion of the shaft part 2 of the excessively long bolt 1B is received by the second slide surface 32B to cause the head part 3 to be spaced above the first slide surface 32A, a conveying force is exerted on the excessively long bolt 1B to incline the head part 3 to a back side in the conveying direction so that an angular portion of the head part 3 is received by the first slide surface 32A. The angular portion of the lower end portion of the shaft part 2 comes into contact with the second slide surface 32B. As a result, the angular portion of the head part 3 sometimes moves on the first slide surface 32A in a dragging manner. Specifically, the excessively long bolt 1B is inclined to the back side in the conveying direction to be placed in an inclined state in which the lower end portion of the shaft part 2 is located ahead of the head part 3. Such an inclined state is not a state in which the lower surface of the head part and the lower end portion of the shaft part of the excessively long bolt 1B are received so as to be capable of sliding on the first slide surface 32A and the second slide surface 32B, respectively. Therefore, supporting stability for the excessively long bolt 1B cannot be maintained. As a result, the excessively long bolt 1B drops from the sorting member 32.

In the inclined state described above, the angular portion of the head part 3 comes into abutment against an open-side angular portion 11 of the first slide surface 32A on the shaft 2 side. Therefore, there arises a phenomenon in which a force toward an open side of the sorting member 32 is exerted on the head part 3. Such a force component described above may offer reliable dropping.

An inclination direction of the excessively long bolt 1B in the conveying direction may become opposite to the above-mentioned direction in some cases. Even in this case, the angular portion of the head part 3 comes into abutment against the open-side angular portion 11. Therefore, a force toward the open side of the sorting member 32 is exerted onto the head part 3. Such a force component may offer reliable dropping.

When the excessively short bolt 1C is transferred to the sorting member 32, the head part 3 is located at a position lower than the first slide surface 32A. As a result, the standing state of the bolt 1C becomes unstable. When the vibration is applied, the bolt 1C drops in a falling fashion as indicated by the arrowed line. Further, an upper side of the excessively short bolt 1C is slightly inclined to the left relative to the vertical line O-O, and hence the excessively short bolt 1C easily drops. The excessively short bolt 1C becomes unstable as described above because the outer peripheral portion of the head part 3 comes into contact with an upper portion 32C of the sorting member 32 to further incline the posture to the left side relative to the vertical direction as illustrated in FIG. 5E.

When a length of the normal bolt 1A is changed, the sorting member 32 is removed from the supporting member 38 so as to be replaced with the sorting member 32 having a different length of an interval between the first slide surface 32A and the second slide surface 32B. In this manner, the normal bolt 1A having a different length can be dealt with flexibly.

For example, when the receiving member 30 is coupled to the base member 35, a fixing bolt inserted from a lower side of the base member 35 is screwed into the receiving member 30 through the supporting member 36 is given as one method, although not illustrated. Similarly, the sorting member 32 can also be mounted and removed with a fixing bolt similar to that used for the receiving member 30. Therefore, the change in length of the normal bolt 1A can be easily dealt with.

Figure 1:
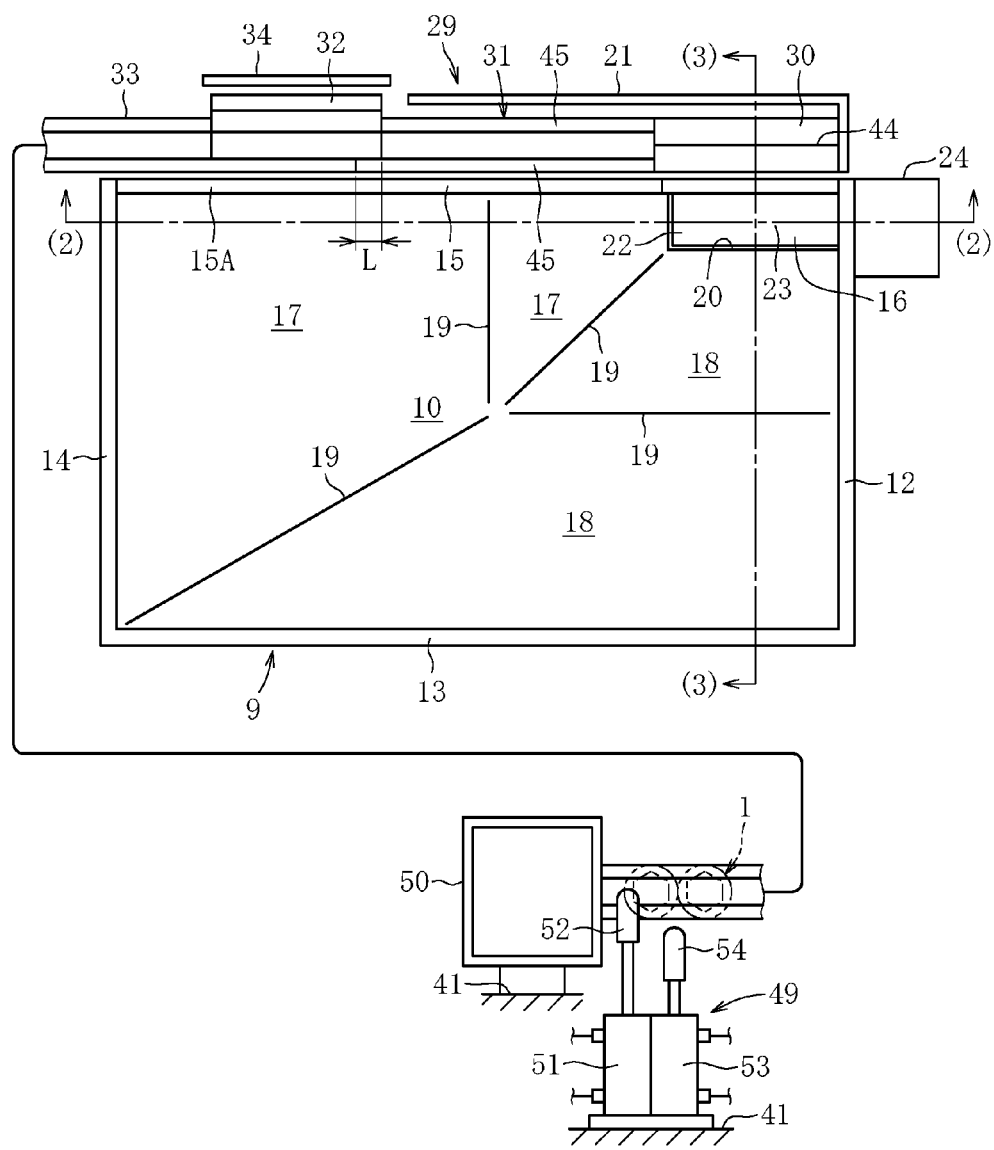
FIG. 1 is a plan view of an entire apparatus according to an embodiment.
Figure 2:
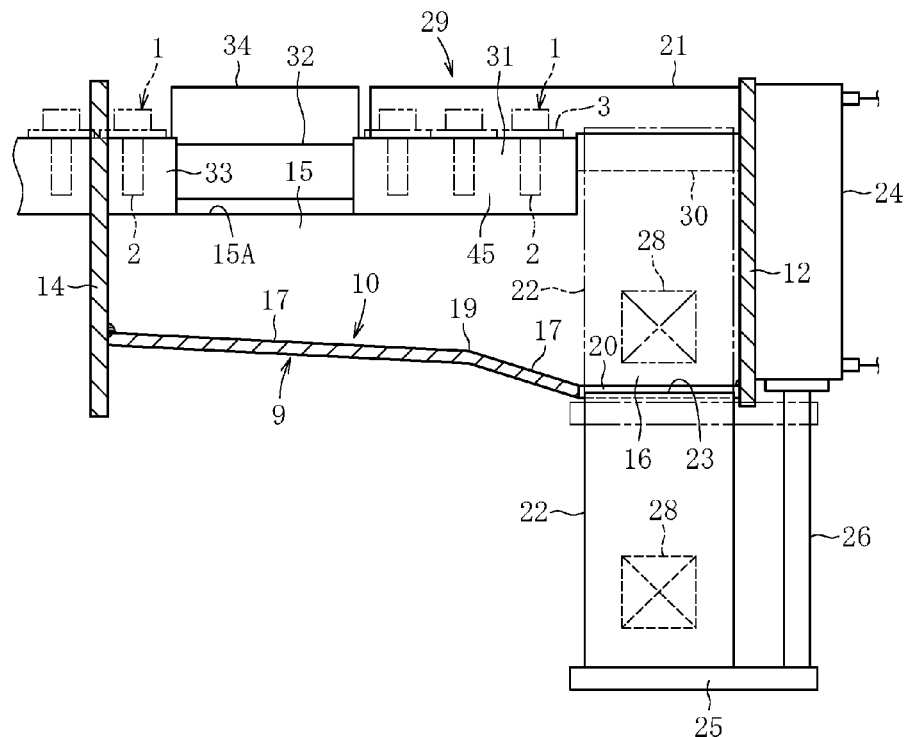
FIG. 2 is a sectional view taken along the line (2)-(2) of FIG. 1.

In order to smoothly transfer the bolt 1 from the suspending member 31 to the sorting member 32, the rail member 45 on a side closer to the wall plate 15 is set longer than the rail member 45 on another side by a length L (see FIG. 1).

As illustrated in FIG. 5B, when the bolt 1 transported in the suspended state comes to a portion L, the rail member 45 on the side farther from the wall plate 15 first ends because of the difference corresponding to the length L. Therefore, the bolt 1 is inclined so as to be higher on the wall plate 15 side. With such an inclination described above, the transfer is performed in a state along the sorting member 32 inclined to the outer side. Specifically, as illustrated in FIG. 5C, the normal bolt 1A is smoothly transferred to the sorting member 32.

When the bolt 1 is transported sideways on the suspending member 31 or is transported with the head part 3 down with some cause, the bolt 1 falls off the suspending member 31 to the sorting member 32 side to collide against parts of the sorting member 32 because the suspended state is not appropriate. As a result, the bolt 1 is bounced thereby to drop into the storage container 9.

As described above, when the posture of the bolt on the suspending member 31 is abnormal, or the length of the bolt is excessively long or excessively short, the bolts all drop into the storage container 9. As a result, only the normal bolt 1A in the state illustrated in FIG. 5C passes therethrough, thereby reliably excluding the abnormal bolts. In other words, the lower surface of the head part 3 slides on the first slide surface 32A, and the lower end portion of the shaft part 2 slides on the second slide surface 32B, as illustrated in FIG. 5C. Only when both the slides are performed at the same time, the passage of the normal bolt 1A is allowed.

Next, a configuration subsequent to the sorting member is described.

Subsequent to the sorting member 32, the bolt is put into a receiving box or is transported to the suspending member 33 as illustrated. Herein, after a predetermined number of bolts are allowed by a counting unit 49 to pass from the suspending member 33 and are accumulated in a standby box 50, a lid of the box 50 is opened to pick up a predetermined number of the bolts 1.

There are various configuration examples of the counting unit 49. Herein, the counting unit is of a type of advancing and retracting a pair of regulating members 52 and 54. The regulating member 52 to be advanced and retracted by an air cylinder 51 is advanced to stop the first bolt 1, whereas the regulating member 54 to be advanced and retracted by an air cylinder 53 is on standby in a retracted position. After the regulating member 54 is advanced to stop the movement of the second bolt 1, and then the regulating member 52 is retracted, only the first bolt 1 is dropped into the standby box 50.

After that, when the regulating member 54 is retracted simultaneously with the advancement of the regulating member 52 again, the bolt 1 that has been at a second position is stopped at a first position. In the order described above, the second bolt is dropped.

In order to prevent the bolt 1 from falling outside of the linear feeder 29, protective plates 21 and 34 are provided. The protective plate 21 has an elongated L-like shape in plan view, and is fixed to an end surface of the receiving member 30 by a bolt or the like. Further, the protective plate 34 is fixed to a rear surface of the sorting member 32 by a bolt or the like.

Next, a transport behavior for the bolt is described.

As illustrated in FIG. 1, FIG. 2, FIG. 3, and FIG. 5A, when the lift member 22 is positioned at the lowest level through the action of the air cylinder 24, the plurality of bolts 1 are in a standby state on the lower portion 16 including the placement surface 23. When the lift member 22 is moved up in this state, the bolts 1 present on the placement surface 23 are moved up while being in contact with the inner surface (inner wall) of the wall plate 15 and are stopped at a position at which the placement surface 23 is positioned adjacent to the V-shaped sectional portion 44.

The placement surface 23 is lower on a side closer to the V-shaped sectional portion 44. Therefore, the bolt 1 is transferred onto the V-shaped sectional portion 44 after passing over an upper end portion of the wall plate 15.

As illustrated in FIG. 5A, the bolts 1 take various postures including a sideways state, an upside-down state with the head part 3 down, and an obliquely oriented state on the V-shaped sectional portion 44. When these bolts 1 are transported on the V-shaped sectional portion 44 with the vibration, the bolts 1 take a posture along the root portion of the V-shaped sectional portion 44. When the shaft part 2 is inserted between the rail members 45 by its own weight in this state, the lower surface of the head part 3 is received by the slide surface 46, resulting in a hanged state of the bolt 1.

After the bolts are moved through the suspending member 31 in the hanged state described above and transferred to the sorting member 32, the normal bolt 1A is transported in a state illustrated in FIG. 5C, whereas the excessively long bolt 1B and the excessively short bolt 1C drop as indicated by the arrowed lines in FIG. 5D and FIG. 5E. In this manner, only the normal bolt 1A passes through the counting unit 49 and sent to the standby box 50.

In place of the above-mentioned various types of air cylinders, an electric motor for back-and-forth output can be adopted. Further, the above-mentioned permanent magnet can be replaced with an electromagnet.

The above-mentioned back-and-forth action of the lift member and action of the counting unit can be performed easily with a generally employed control method. Through combination of an air switching valve configured to be operated by a signal from a controller or a sequence circuit, a sensor configured to give a signal when the air cylinder is located at a predetermined position to transmit the signal to the controller, and the like, predetermined actions can be ensured.

Functions and effects of the first embodiment described above are as follows.

Functions and effects relating to the lift-up of the part on the lower portion are as follows.

The lower portion 16 is formed in the vicinity of the end portion of the bottom member 10 of the storage container 9. The lift member 22 configured to lift the bolt 1 kept on standby on the lower portion 16 is arranged in a state of being movable up and down along the inner walls of the storage container 9. Therefore, the lift member 22 is moved up and down along the end portion of the storage container 9 so that the amount of parts to be accommodated in the storage container 9 can be increased as much as possible. Specifically, the lower portion 16 is positioned in the vicinity of the end portion of the bottom member 10, and hence the lift member 22 can also be arranged close to the end portion of the storage container 9. With this, enlargement of space for accommodating parts can be achieved.

The lift member 22 is moved up and down along the inner walls of the storage container 9. Therefore, the bolt 1 placed on the placement surface 23 corresponding to the upper surface of the lift member 22 is moved up while being in contact with the inner wall. Therefore, the bolt 1 is maintained in a state of being placed on the placement surface 23 of the lift member 22, and the bolt 1 is reliably transferred to the linear feeder 29 being the transport unit. As a result, operation reliability of the apparatus may be improved. Then, through enlargement of the part placement surface of the lift member 22, a large number of bolts 1 can be transported with a single lifting action, thereby being capable of improving conveyance efficiency.

Further, the lift member 22 is moved up and down along the inner wall of the storage container 9. Thus, the bolt 1 kept on standby on the lower portion 16 can be reliably lifted. Further, the lifting resistance of the lift member 22 that is moved up so as to push through the mass of parts is reduced. Thus, only a small driving force is required to move up the lift member 22. For example, when the lift member 22 is moved up and down by the air cylinder, this is effective for downsizing of the air cylinder.

The receiving member 30 from which the bolt 1 is transferred to the linear feeder 29 is set in the vicinity of the upper position of the lift member 22. Thus, the bolt can be reliably transferred to the linear feeder 29. At the same time, the elongated transport unit, e.g., the linear feeder 29 can be arranged along the side surface of the storage container 9, which is effective for compactification of the entire apparatus.

The lift member 22 is moved up and down at the corner portion of the storage container 9 having the rectangular shape, specifically, the corner portion formed between the wall plate 12 and the wall plate 15. Meanwhile, the receiving member 30 serving as a starting point of transport of the parts by the linear feeder 29 is also arranged adjacent to the above-mentioned corner portion. Therefore, a positional relationship is achieved in which the end portion of the linear feeder 29 as viewed in the longitudinal direction is adjacent to the end portion of the storage container 9. As a result, a combination in which the linear feeder 29 is arranged closely along the storage container 9 is achieved, thereby promoting the compactification of the apparatus.

The transport unit is constructed of an elongated unit, e.g., the linear feeder 29, and is arranged so as to extend along the straight lateral side surface of the storage container 9. As a result, the integration of the storage container 9 and the linear feeder 29 can be achieved with minimum spacing, which is effective for the compactification of the apparatus.

The air cylinder 24 configured to move the lift member 22 up and down is mounted to the outer wall surface of the storage container 9. Therefore, the integration of the air cylinder 24 and the storage container 9 can be achieved with minimum spacing, which is effective for the compactification of the apparatus. The air cylinder 24 is a vertically moving part of the lift member 22. A back-and-forth output type electric motor can be used in place of the air cylinder 24.

Functions and effects relating to the disentanglement of the parts are as follows.

The parts are a pile of the bolts 1 made of iron. Therefore, fitting of the crest portion of the thread into the root portion of another thread, biting of the angular portion of the head part 3 bites into the root portion of the thread, holding of the lower surfaces of the head parts 3 in close contact with each other, or being exerted with the own weight of the bolt 1 may bring about various forms of entanglement or clogging. As a result, the integrated mass of parts in which the large number of bolts 1 are tangled with each other in a bound fashion is formed. Some of the bolts 1 in the banded state described above are sucked toward the lower portion 16 by the sucking unit, e.g., the magnet 28 to cause an unpiling phenomenon in part of the mass of parts.

The mass of parts in the banded state described above is partially unpiled to be disentangled. Sequentially, the disentangling action is expanded in a chain-reaction manner to enlarge a range in an unbound state in the region close to the sucking unit 28. In this manner, the tangled mass of parts is partially sucked toward the lower portion 16. The standby state of the bolts 1 on the lower portion 16 can be achieved through the partial disentanglement, thereby promoting the movement of the bolts 1.

In this manner, the bolt 1 can be reliably kept on standby on the lower portion 16. Therefore, the feeding of the bolt 1 to the target position by the lift member 22 corresponding to a vertically movable part can be achieved with high reliability.

Further, the lift member 22 is configured to move the bolt 1 kept on standby on the lower portion 16. Thus, the lift member 22 is prevented from being moved up so as to push through the piled mass of parts. Therefore, the lifting resistance of the lift member 22 is reduced, and hence only a small driving force is needed to move up the lift member 22. For example, when the lift member 22 is moved up and down by the air cylinder 24, this is effective for the downsizing of the air cylinder 24.

When the pushing member 56 corresponding to the pushing unit is used in place of the sucking unit 28 described above, the pushing force is exerted on the part of the mass of parts in the banded state to cause the unpiling phenomenon in this part of the bolts 1.

The mass of parts in the banded state described above is partially unpiled to be disentangled. Sequentially, the disentangling action is expanded in a chain-reaction manner to enlarge the range in the unbound state in the region close to the pushing member 56. In this manner, the entangled or clogged mass of parts is partially moved toward the lower portion 16. The bolts 1 can be kept on standby on the lower portion 16 through the partial disentanglement, thereby promoting the movement of the bolts 1.

In this manner, the bolts 1 can be reliably kept on standby on the lower portion 16. Therefore, the feeding of the bolt 1 to the target position by the lift member 22 corresponding to the vertically movable part can be achieved with high reliability.

Further, the lift member 22 is configured to move the bolt 1 kept on standby on the lower portion 16, and therefore is prevented from being moved up so as to push through the piled mass of parts. Therefore, the lifting resistance to the lift member 22 is reduced, and hence the driving force to move up the lift member 22 only needs to be small. For example, when the lift member 22 is moved up and down by the air cylinder 24, this is effective for the downsizing of the air cylinder 24.

The permanent magnet 28 corresponding to the sucking unit is arranged in the embedded state in the lift member 22. Therefore, a mounting position of the permanent magnet 28 in the vertical direction can be selected so that the permanent magnet 28 can be kept on standby at an optimal position in conjunction with the vertical action of the lift member 22. Specifically, when the lift member 22 is moved up to the highest level, the permanent magnet 28 is arranged at the position close to the lower portion 16. As a result, the bolt 1 can be separated from the banded mass of the bolts 1 to be attracted to the lower portion 16. When the lift member 22 is moved down to the lowest level, the bolt 1 can be reliably kept on standby on the placement surface 23.

Functions and effects relating to the sorting member are as follows.

As described above, the first slide surface 32A and the second slide surface 32B, on which the lower surface of the head part 3 and the lower end portion of the shaft part 2 slide respectively at the same time, are formed on the sorting member 32. In addition, the sorting member 32 is configured to be continuous with the rail members 45 in a state of being inclined to the side opposite to the direction in which the bolt having an abnormal length drops. Therefore, the lower surface of the head part 3 and the lower end portion of the shaft part 2 of the bolt 1 having a normal length slide on the first slide surface 32A and the second slide surface 32B at the same time, specifically, are supported on both the slide surfaces at the same time. In addition, the inclination in the direction described above is given to the sorting member 32. Therefore, the normal bolt 1A is maintained in a stable posture by the support at two positions corresponding to the both slide surfaces and the above-mentioned inclination to achieve reliable transport. Specifically, in order to drop the bolts 1B and 1C, each having an abnormal length, from the sorting member 32, a drop side has an open form. However, the normal bolt 1A is conveyed in a state with no fear of dropping.

When the excessively long bolt 1B is transported from the rail members 45 to the sorting member 32, the lower end portion of the shaft part 2 comes into contact with the second slide surface 32B, whereas the head part 3 is located at a position above the first slide surface 32A so as to be spaced away therefrom. Therefore, standing stability of the excessively long bolt 1B is lowered. When vibration for conveyance is applied thereto, it becomes impossible to maintain the standing state. As a result, the excessively long bolt 1B drops in such a manner as to fall to the side opposite to the inclination direction of the sorting member 32.

When the lower end portion of the shaft part 2 is received by the second slide surface 32B and the head part 3 is spaced above the first slide surface 32A as in the case of the excessively long bolt 1B, the head part 3 is inclined to the back side in the conveying direction by exertion of the conveying force onto the excessively long bolt 1B so that the angular portion of the head part 3 is received by the first slide surface 32A and the angular portion of the lower end portion of the shaft part 2 comes into contact with the second slide surface 32B. As a result, the angular portion of the head part 3 sometimes moves on the first slide surface 32A in a dragging manner. Specifically, the excessively long bolt 1B is inclined to the back side in the conveying direction to achieve the inclined state in which the lower end portion of the shaft part 2 is located ahead of the head part 3. Such an inclined state is not a state in which the lower surface of the head part and the lower end portion of the shaft part of the bolt are received by the first slide surface 32A and the second slide surface 32B so as to be slidable thereon. Therefore, the supporting stability for the excessively long bolt 1B cannot be maintained, and hence the excessively long bolt 1B drops from the sorting member 32.

As described above, when the excessively long bolt 1B is inclined in the conveying direction, the head part 3 is brought into abutment against the open-side angular portion 11 of the first slide surface 32A. The head part 3 is placed in a state of being pushed toward the open side of the sorting member 32, specifically, toward the open space 48, thereby dropping the excessively long bolt 1B.

When the excessively short bolt 1C is transported from the rail members 45 to the sorting member 32, the lower end portion of the shaft part 2 comes into contact with the second slide surface 32B. However, the head part 3 comes into contact with the lateral side surface 32C of the sorting member 32 at a position lower than the first slide surface 32A to lower the standing stability of the excessively short bolt 1C. When the vibration for conveyance is applied thereto, it becomes impossible to maintain the standing state.

As a result, the excessively short bolt 1C drops in a falling manner to the side opposite to the inclination direction of the sorting member 32.

Further, when the head part 3 comes into contact with the open-side angular portion 11 of the first slide surface 32A during a transient period in which the excessively short bolt 1C is transferred to the sorting member 32, the excessively short bolt 1C drops in such a manner as to be bounced by the open-side angular portion 11.

When the normal bolt 1A reaches the sorting member 32 in a sideways state or a state with the head part 3 down, the normal bolt 1A drops after mainly coming into abutment against the open-side angular portion 11 to be bounced thereby.

Second Embodiment

Figure 9:
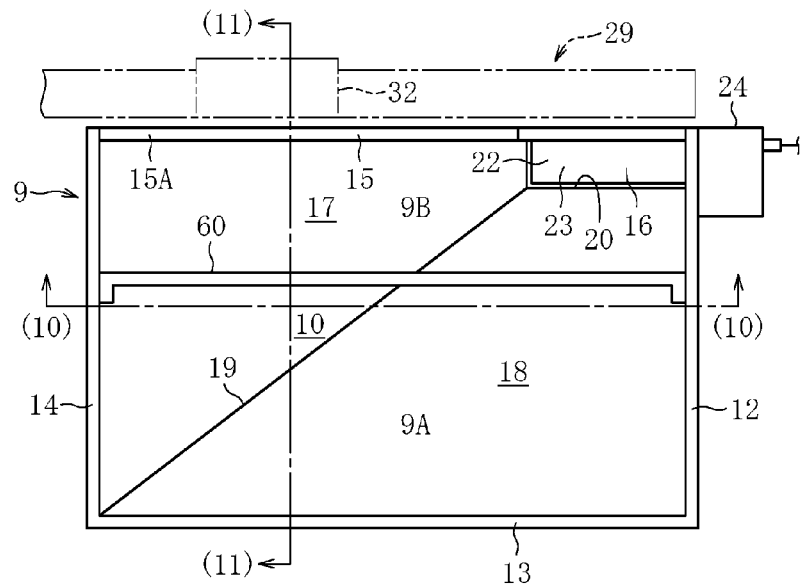
FIG. 9 is a plan view for illustrating another embodiment.
Figure 10A:
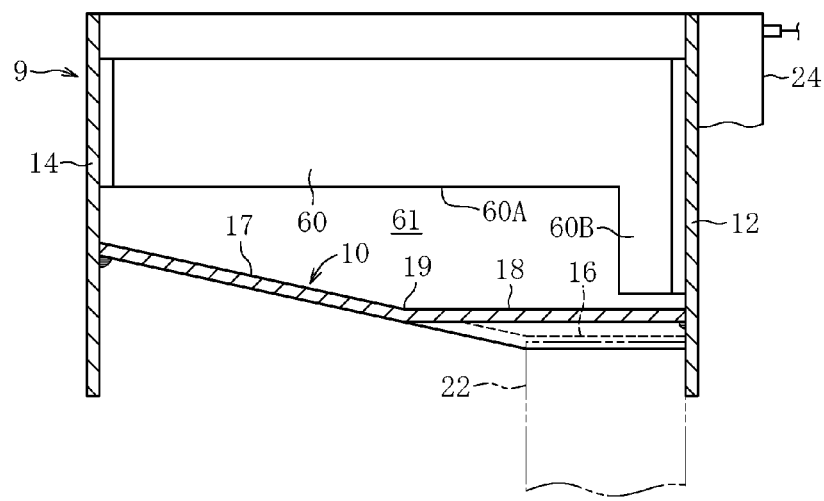
FIG. 10A is a sectional view taken along the line (10)-(10) of FIG. 9.
Figure 10B:
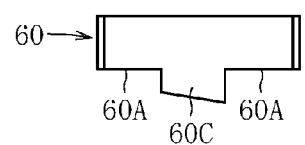
FIG. 10B is a side view for illustrating a modified example of a partition control member.
Figure 10C:
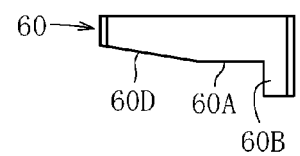
FIG. 10C is a side view for illustrating another modified example of the partition control member.
Figure 11:
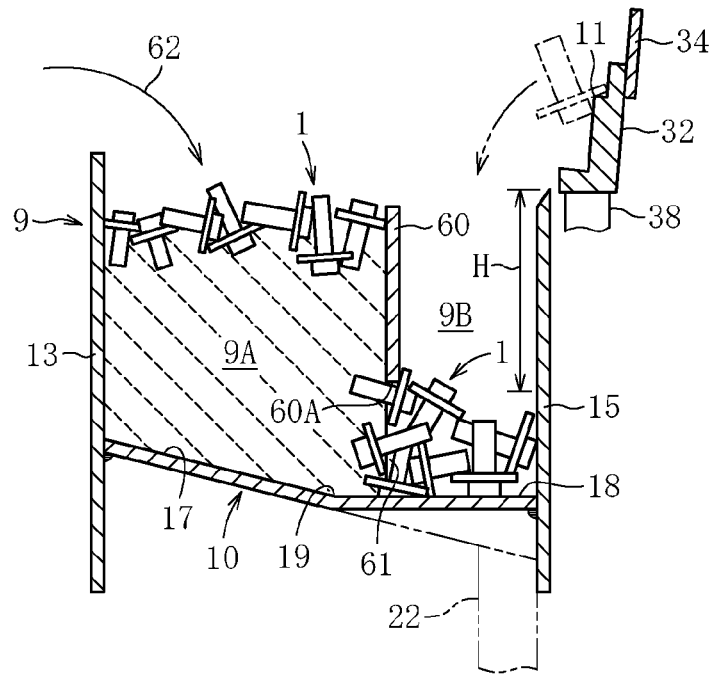
FIG. 11 is a sectional view taken along the line (11)-(11) of FIG. 9.

FIG. 9 to FIG. 11 are views for illustrating a second embodiment of the present invention.

In the second embodiment, a partition control member is provided to the storage container so as to partition the storage container into a first storage space and a second storage space.

The bottom member 10 comprises the first slope 17 becoming lower toward the right side in FIG. 9 and the second slope 18 being downward toward the upper side. At a boundary between both the slopes, the single holding line 19 is formed in a diagonal direction.

A partition control member 60 configured to partition the storage container 9 into a first storage space 9A and a second storage space 9B is provided. The partition control member 60 is constructed of a flat plate-like member made of a material such as a steel plate or a stainless steel plate. Alternatively, the partition control member 60 may be constructed of a flat member such as a metal mesh or a punched metal. In this case, the stainless steel plate is used. Both ends thereof are fixed to an inner surface of the wall plate 12 and an inner surface of the wall plate 14 with bolts or by welding.

The first storage space 9A is formed as a space for storing a large amount of the bolts 1 that have been fed from outside, whereas the second storage space 9B is configured as a standby space in which the amount of bolts 1 to be lifted by the lift member 22 is reduced to be smaller than the large amount of parts in the first storage space 9A. As is apparent from FIG. 9, a region of the first storage space 9A in plan view is set larger than a region of the second storage space 9B so as to store the bolts 1 as much as possible.

A passage portion 61 configured to limit the amount of the bolts to be moved to the second storage space 9B through the entanglement of the bolts 1 from the first storage space 9A toward the second storage space 9B is formed between a lower end portion of the partition control member 60 and the bottom member 10. There are various ways of forming the passage portion 61. As illustrated in FIG. 10A, an elongated plate material having a vertical width set to a given dimension is mounted at a predetermined height to form an opening space between a lower edge portion 60A of the plate material and the bottom member 10, and the opening space is used as the passage portion 61.

The bolt 1 has a serrated surface due to the formation of the male threads, the washer 3B is movable with play, or the head part 3 is angular. Therefore, when a large number of bolts 1 pass through the passage portion 61, the respective parts of the bolts become tangled or clogged. Therefore, smooth passage through the passage portion 61 becomes more difficult. Through application of difficulty in the passage described above, the amount of the bolts to be moved from the first storage space 9A to the second storage space 9B is limited.

As indicated by the arrowed line 62 in FIG. 11, the large number of bolts 1 supplied by the worker to the first storage space 9A fully fill the space 9A. In the second storage space 9B, however, the number of bolts kept on standby therein is remarkably smaller than the amount of storage in the first storage space 9A by limiting the passage through the passage portion 61. When the reduced number of bolts 1 in the second storage space 9B as described above are transferred by the lift member 22 to the linear feeder 29 being the transport unit to reduce the number of standby bolts, the entanglement or the clogging between the bolts 1 at the passage portion 61 is reduced. Therefore, the bolts 1 are supplied to the second storage space 9B.

The lower edge portion 60A illustrated in FIG. 10A is formed linearly in a horizontal direction. As described above, the passage of the large number of bolts 1 is limited by the passage portion 61. Therefore, a height of the pile of the bolts 1 in the second storage space 9B, specifically, the number of standby bolts is set based on a height position of the lower edge portion 60A.

An opening shape of the passage portion 61 is varied in accordance with a shape or a size of the part. When the lower edge portion 60A extends linearly in the horizontal direction so that the passage area of the passage portion 61 has a sufficient size as illustrated in FIG. 10A, the bolts 1 are excessively concentrated in the lower portion 16 due to the combination of the first slope 17 and the second slope 18. Therefore, a regulating piece 60B is formed by extending an end portion of the partition control member 60 downward, as illustrated in FIG. 10A. With the regulating piece 60B, the number of bolts 1 passing through the lower portion 16 side of the passage portion 61 is reduced to reduce the amount of standby bolts on the lower portion 16, thereby reducing a lifting load of the lift member 22.

The partition control member 60 illustrated in FIG. 10B is formed by extending a projecting regulating piece 60C downward from a center portion of the lower edge portion 60A extending in the horizontal direction, thereby providing an appropriate amount of the bolts to be moved from the first storage space 9A to the second storage space 9B.

The partition control member 60 illustrated in FIG. 10C includes an inclined lower edge portion 60D obtained by forming the lower edge of the partition control member 60 in accordance with an inclination of the first slope 17. The amount of bolts to pass therethrough is increased by the inclined lower edge portion 60D.

Further, as illustrated in FIG. 9, the partition control member 60 is arranged in parallel to the wall plate 13 or the wall plate 15. Through arrangement of the partition control member 60 in an oblique direction, or curving or bending of the partition control member 60, the amount of passage through the passage portion 61 or the amount of bolts stored in the second storage space 9B can be adjusted.

In the manner described above, an opening shape of the passage portion 61 is suitably selected so that the number of standby bolts and a position in the second storage space 9B at which the bolts are kept on standby can be selected.

For dropping of the bolt 1 from the sorting member 32 into the second storage space 9B, the second storage space 9B is required to have a drop height H to accommodate the drop. In the second storage space 9B, the number of standby bolts 1 is remarkably smaller than that in the first storage space 9A. Therefore, as illustrated in FIG. 11, the drop height H can be ensured. When the amount of bolts in the second storage space 9B is such a number as to fill the first storage space 9A, the sufficient drop height H cannot be ensured. As a result, the dropping is not performed swiftly enough, or the dropped bolt 1 bounces and falls out of the storage container 9. However, such an abnormal phenomenon does not occur here.

The remaining configuration is the same as that of the first embodiment described above, including portions not illustrated. The members having the same functions are denoted by the same reference symbols.

Functions and effects of the second embodiment described above are as follows.

The bolt 1 is parts having an angular shape or a serrated shape, e.g., the male threads. Therefore, when the bolt 1 passes through the passage portion 61, the bolts 1 become tangled or clogged. As a result, smooth passage becomes more difficult. The passage is limited at the passage portion 61. Therefore, the amount of bolts staying in the second storage space 9B becomes remarkably smaller than the amount of bolts stored in the first storage space 9A. The second storage space 9B serves as a standby space for the bolts 1 reduced in amount as described above. Therefore, the number of bolts to be lifted by the lift member 22 does not become excessive. As a result, power required to move up the lift member 22 can be reduced. The size of the air cylinder 24 configured to move up the lift member 22 or the amount of compressed air to be used can be reduced, and thus the parts feeder according to this embodiment becomes more economically advantageous. Further, when the lift member 22 is to be moved up and down by the back-and-forth output type electric motor in place of the air cylinder 24, the parts feeder according to this embodiment is effective in electricity consumption saving.

In other words, for example, when a large amount of bolts 1 are stored as in the first storage space 9A, the lift member 22 is required to be pushed up against a resistance due to a weight of the large amount of bolts, the entanglement or the clogging of the bolts, or the like. However, the bolts 1 reduced in amount are kept on standby in the second storage space 9B. Therefore, the lifting resistance to the lift member 22 can be reduced.

On the other hand, the function of storing a large amount of bolts 1 is reliably achieved in the first storage space 9A by limiting the passage at the passage portion 61. Therefore, even when the storage space of the first storage space 9A is increased, an adverse effect, e.g., excessive feeding to the second storage space 9B can be prevented. Further, an interval between the feedings of the bolts to the first storage space 9A can be prolonged, and thus the parts feeder according to this embodiment is advantageous in terms of bolt supply management.

In the manner described above, the amount of bolts stored in the first storage space 9A can be increased, while an appropriate reduction in amount of bolts on standby in the second storage space 9B is achieved.

The other functions and effects are the same as those of the first embodiment described above.

Third Embodiment

Figure 12:
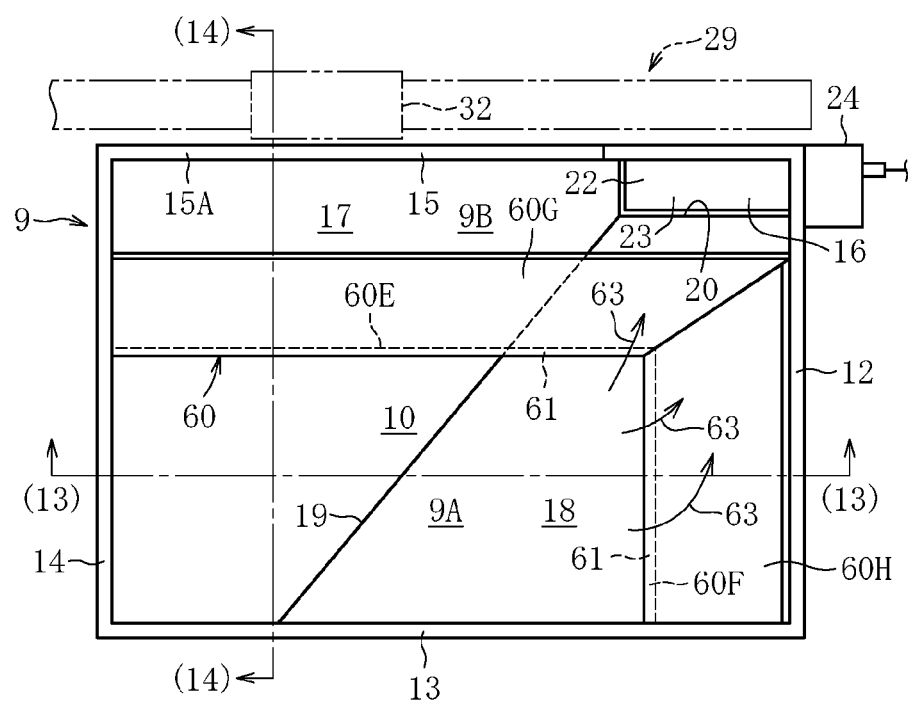
FIG. 12 is a plan view for illustrating yet another embodiment.
Figure 13:
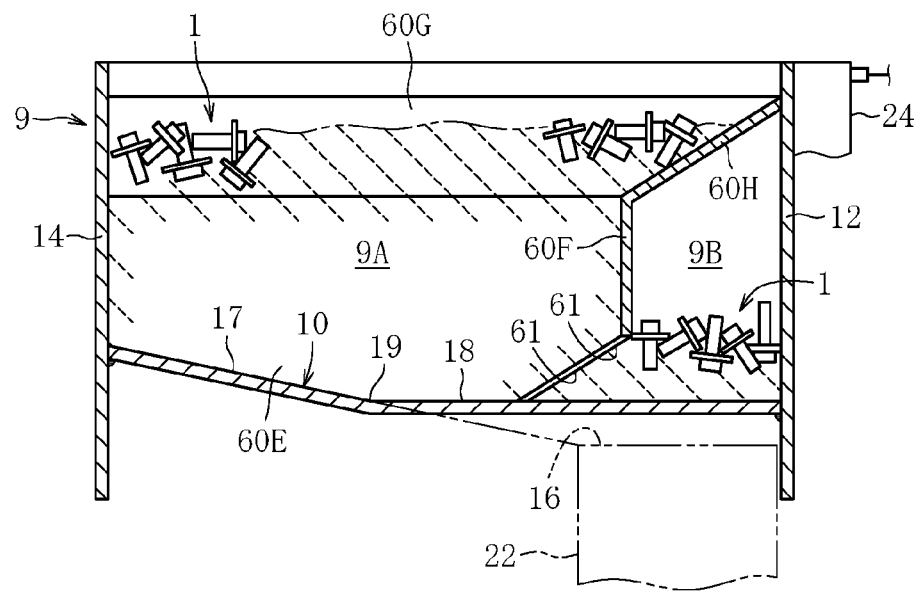
FIG. 13 is a sectional view taken along the line (13)-(13) of FIG. 12.
Figure 14:
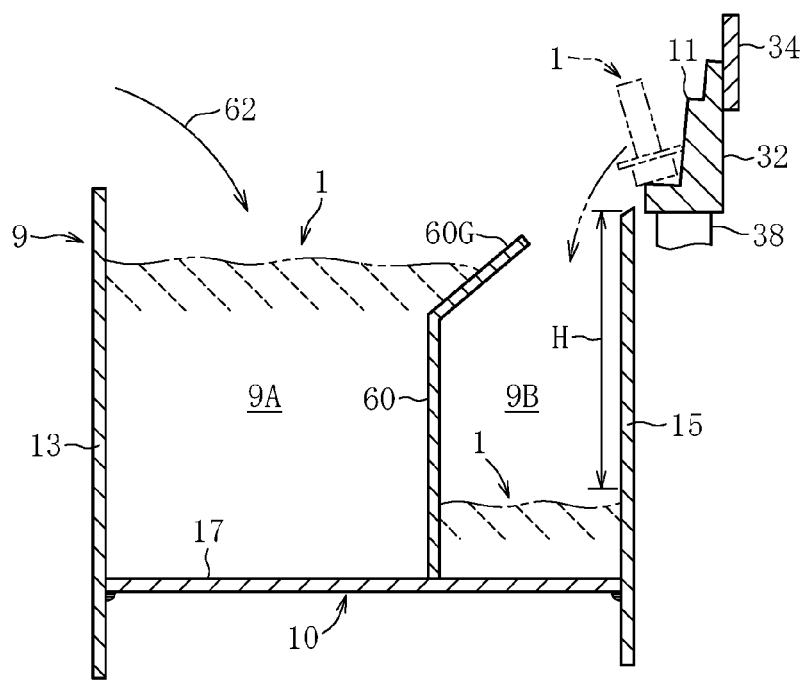
FIG. 14 is a sectional view taken along the line (14)-(14) of FIG. 12.

FIG. 12 to FIG. 14 are views for illustrating a third embodiment of the present invention.

In the third embodiment, the passage portion 61 of the partition control member provided to the storage container is formed at a position through which the bolts 1 are guided toward the lift member 22.

As illustrated in FIG. 12, the partition control member 60 comprises a long plate 60E and a short plate 60F formed into a horizontally elongated inverse L-shape. The passage portion 61 is formed between a lower end portion of the short plate 60F and the bottom member 10 (18). The passage portion 61 is formed by cutting an end portion of the long plate 60E in an oblique direction so as to be also formed at an end portion of the long plate 60E, as illustrated in FIG. 13.

The passage portion 61 formed as described above is formed at a position close to the lift member 22. Specifically, as illustrated in FIG. 12, the lift member 22 is arranged on the upper right in the storage container 9. The passage portion 61 is formed at a right side portion of the partition control member 60. Through the arrangement described above, the passage portion 61 is formed at a position close to the lift member 22.

Inclined guiding plates 60G and 60H are formed at upper edges of the long plate 60E and the short plate 60F, respectively. When the large number of bolts 1 are supplied to the first storage space 9A as indicated by the arrowed line 62, the bolts 1 are smoothly guided to the first storage space 9A and are prevented from spilling to the second storage space 9B.

The bolts 1 stored in the first storage space 9A pass through the passage portion 61 and slide down the second slope 18 to be guided toward the lift member 22, as indicated by the arrowed lines 63. Although the passage portion 61 is formed as described above, a shape of a passage opening at this part can be variously changed in accordance with the shape and the size of the part or the number of times of vertical movement of the lift member 22, for example, the oblique cut portion formed at the end portion of the long plate 60E is eliminated.

The remaining configuration is the same as that of each of the embodiments described above, including portions not illustrated. The members having the same functions are denoted by the same reference symbols.

Functions and effects of the third embodiment described above are as follows.

The passage portion 61 is formed at a position close to the lift member 22. Therefore, the bolts 1 whose amount to be moved is limited at the passage portion 61 are guided by the second slope 18 toward the lift member 22. Specifically, the bolts 1 are moved toward the lift member 22 after the number of bolts to pass therethrough is limited at the passage portion 61. Therefore, the number of bolts lifted up by the lift member 22 does not become excessively large. As a result, the lifting load of the lift member 22 is reduced.

The bolts 1 that have passed through the passage portion 61 are guided to the lift member 22. On the other hand, the bolts 1 drop from the sorting member 32 to a position away from the lift member 22. Therefore, a uniform stack of the bolts can be obtained over the entire region of the second storage space 9B so as to be prevented from being distributed on the lift member 22 in an excessively imbalanced manner. As a result, the lifting load of the lift member 22 can be reduced.

The other functions and effects are the same as those of each of the embodiments described above.

Fourth Embodiment

Figure 15:
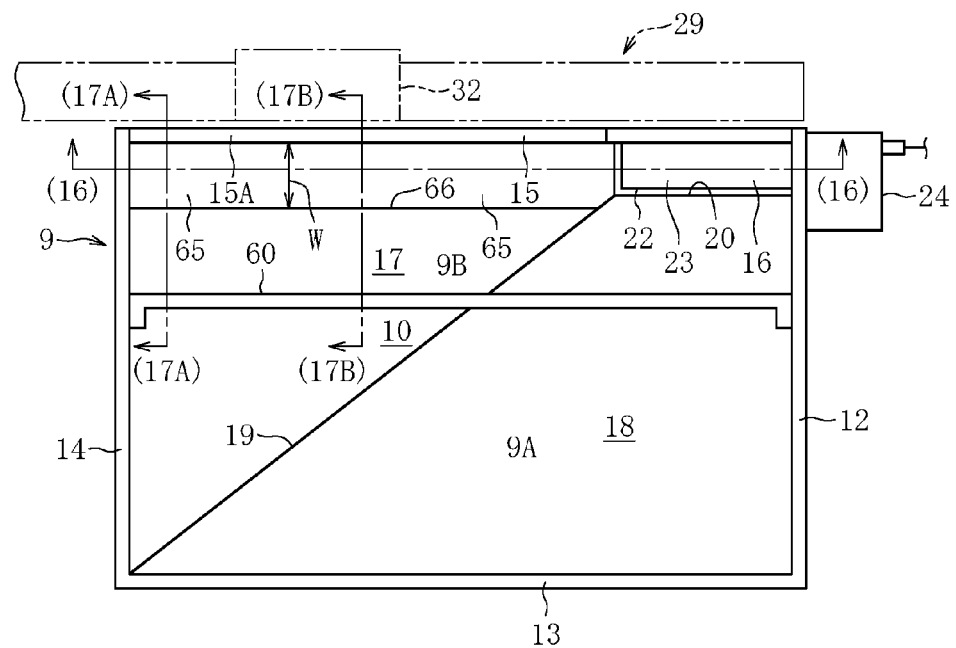
FIG. 15 is a plan view for illustrating yet another embodiment.
Figure 16:
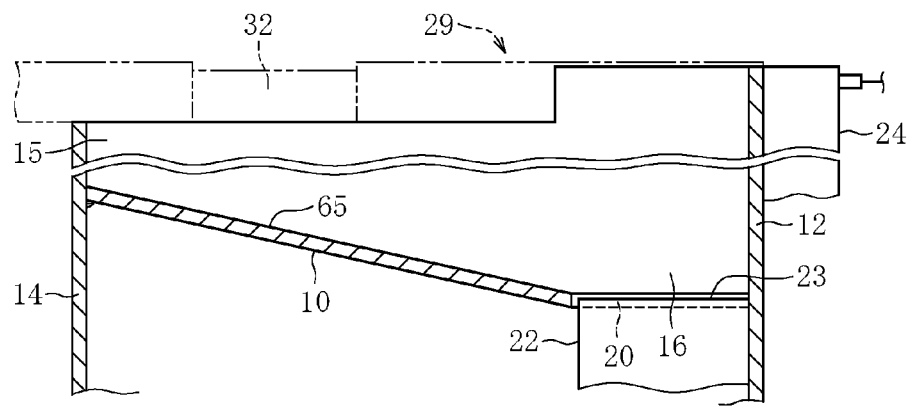
FIG. 16 is a sectional view taken along the line (16)-(16) of FIG. 15.

FIG. 15 to FIGS. 17 are views for illustrating a fourth embodiment of the present invention.

In the fourth embodiment, an elongated guiding slope toward the lower portion 16 is formed as parts of the slope 17 of the bottom member 10 of the second storage space 9B.

A guiding slope 65 is constructed of an elongated slope toward the lower portion 16, and is formed as parts of the slope 17 (the first slope 17 described above) of the bottom member 10. The guiding slope 65 is formed in a horizontal state as with respect to a width direction or in an inclined state so that an end portion on a side closer to the partition control member 60 becomes higher while being formed so as to become lower toward the lower portion 16.

Figure 17A:
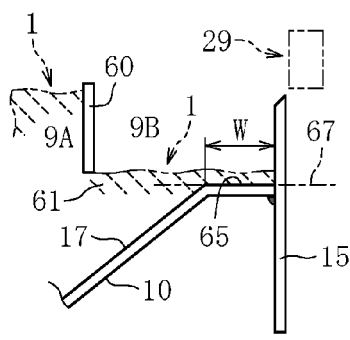
FIG. 17A is a sectional view taken along the line (17A)-(17A) of FIG. 15.
Figure 17B:
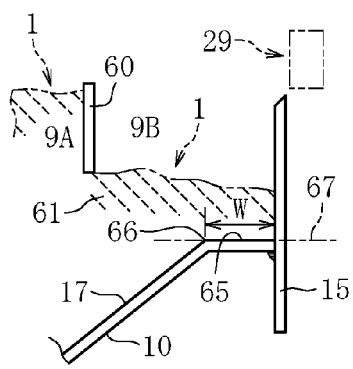
FIG. 17B is a sectional view taken along the line (17B)-(17B) of FIG. 15.

The guiding slope 65 is formed by a surface of an elongated flat plate having a width W so as to become lower toward the lower portion 16 as illustrated in FIG. 15, FIG. 17A, and FIG. 17B. The slope 17 is formed in a continuous state with the guiding slope 65 as described above. Therefore, a holding line (ridge line) 66 is formed. A cross section taken along the line (17A)-(17A) of FIG. 15 is illustrated in FIG. 17A, whereas a cross section taken along the line (17B)-(17B) of FIG. 15 is illustrated in FIG. 17B.

Figure 17C:
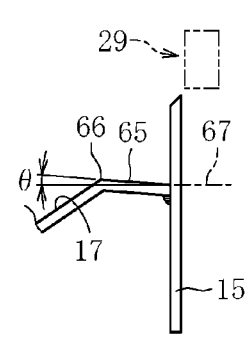
FIG. 17C is a sectional view for illustrating a modified example of a guiding slope.

Further, the guiding slope 65 has a horizontal posture as viewed in the width direction, specifically, a width W direction. As illustrated in FIG. 17A and FIG. 17B, a surface of the guiding slope 65 matches with a horizontal line 67 as viewed on a cross section of the guiding slope 65. Specifically, the guiding slope 65 is not inclined in the horizontal direction but is inclined downward in the direction of transport of the parts. Alternatively, the guiding slope 65 is formed in an inclined state so that the end portion on a side closer to the partition control member 60 becomes higher as viewed in the width direction, specifically, in the width W direction. Specifically, as illustrated in FIG. 17C, the end portion of the guiding slope 65, which is on the side closer to the partition control member 60, becomes higher, resulting in formation of an inclination angle θ.

The guiding slope 65 is arranged along the inner wall of the wall plate 15 and has a lower end portion continuous with the lower portion 16. Alternatively, the guiding slope 65 can also be arranged in the oblique direction in FIG. 15 so that a lower end portion thereof is continuous with the lower portion 16 instead of being extended along the inner wall of the wall plate 15.

The remaining configuration is the same as that of each of the embodiments described above, including portions not illustrated. The members having the same functions are denoted by the same reference symbols.

Functions and effects of the fourth embodiment described above are as follows.

The bolts 1 stored in the second storage space 9B are guided to the lower portion 16 in such a manner as to slide down the guiding slope 65. Some of the bolts 1 stored over the entire region of the second storage space 9B are guided smoothly to the lower portion 16 through the elongated guiding slope 65. Therefore, the bolts 1 in the second storage space 9B are sequentially shifted to the lower portion 16 through the guiding slope 65. In other words, the bolts 1 present on the guiding slope 65 among the bolts 1 present over the entire region of the second storage space 9B slide down the elongated slope toward the lower portion 16. Therefore, the bolts 1 in the second storage space 9B are reliably transferred onto the lower portion 16, that is, the lift member 22 through the guiding slope 65. As a result, the feeding of the parts to the target position is reliably achieved by the lift-up and the action of the transport unit (linear feeder) 29.

The guiding slope 65 lies in the horizontal direction as viewed in the width W direction. Therefore, the bolts 1 present on the guiding slope 65 become less liable to fall off the guiding slope 65. As a result, the number of parts transferred toward the lower portion 16 can be further increased. With this, the number of bolts lifted by the lift member 22 may be increased. Thus, a sufficient number of bolts conveyed by the linear feeder 29 can be ensured.

Alternatively, the guiding slope 65 is formed in the inclined state so that the end portion on the side closer to the partition control member 60 becomes higher. Therefore, when the guiding slope 65 is arranged along the inner surface of the wall plate 15 of the storage container 9, the bolts 1 present on the guiding slope 65 slide down while being in contact with the inner surface of the wall plate 15 of the storage container 9. As a result, the bolts 1 present on the guiding slope 65 are less liable to fall off the guiding slope 65, and thus the parts feeder according to this embodiment is suitable to increase the number of bolts to be transferred toward the lower portion 16.

When the bolt 1 is transported in an abnormal posture or the size of the bolt 1 is excessively large or excessively small, the bolts 1 are configured to be dropped from the sorting member 32 arranged in the linear feeder 29 into the second storage space 9B in some cases. When such a dropping configuration is adopted, the dropped bolts 1 are received by the guiding slope 65. As a result, the dropped bolts are transported preferentially by the lift member 22 to prevent the amount of bolts stored in the second storage space 9B from becoming excessively large, thereby achieving the smooth feeding of the bolts.

The bolts 1 transferred onto the lift member 22 may take various postures. Therefore, the bolts 1 transferred to the linear feeder 29 are not all conveyed in a normal posture. Therefore, the bolts 1 in abnormal postures are dropped from the sorting member 32 into the second storage space 9B with a certain probability. The bolts 1 dropped as described above are guided preferentially to the lower portion 16 through the guiding slope 65. As a result, an appropriate amount of bolts can be stored in the second storage space 9B.

The other functions and effects are the same as those of each of the embodiments described above.

INDUSTRIAL APPLICABILITY

As described above, the present invention provides the parts feeder capable of efficiently conveying the plurality of parts and simplifying the apparatus structure. Therefore, the present invention is available in a wide range of fields of industry, for example, in a vehicle body screwing step for automobiles and a plating assembly step for electric home appliances.

REFERENCE SIGNS LIST

1 bolt, part
1A normal bolt
1B excessively long bolt
1C excessively short bolt
2 shaft part
3 head part
7 head part
8 shaft part
9 storage container
9A first storage space
9B second storage space
10 bottom member
11 open-side angular portion
15 wall plate
29 linear feeder, transport unit
30 receiving member
31 suspending member
32 sorting member
32A first slide surface
32B second slide surface
38 supporting member
44 V-shaped sectional portion
45 rail member
46 slide surface
48 open space
60 partition control member
60A lower edge portion
60B regulating piece
60C projecting regulating piece
60D inclined lower edge portion
60E long plate
60F short plate
61 passage portion
65 guiding slope
O-O vertical line
H drop height
θ inclination angle

The invention claimed is:

1. A parts feeder for feeding parts having angular projection portions, the parts feeder comprising:
    a storage container configured to hold the parts, the storage container including a wall plate and a bottom member, the bottom member having a slope descending toward a lower portion of the bottom member located adjacent to the wall plate;
    a lift member configured to lift one or more of the parts, the lift member being moveable between a lower position adjacent to the lower portion of the bottom member and an upper position, and the lift member being movable along an inner wall of the wall plate;
    a transport unit configured to transport the one or more of the parts that have been lifted by the lift member, the transport unit transporting the one or more of the parts to a target position; and
    a sucking unit provided to the lift member at a height to attract a group of the parts held in the storage container to the lower portion when the lift member is located at the upper position.

2. The parts feeder according to claim 1, wherein
    the lower portion of the bottom member includes a passage hole, and
    the lift member extends through the passage hole when moving from the lower position to the upper position.

* * * * *